United States Patent Office 3,071,492
Patented Jan. 1, 1963

3,071,492
METHOD OF RENDERING STARCH HYDROPHOBIC AND FREE FLOWING
Kenneth P. Satterly, Clinton, Iowa, assignor, by mesne assignments, to Standard Brands Incorporated, New York, N.Y., a corporation of Delaware
No Drawing. Filed Oct. 7, 1953, Ser. No. 384,777
2 Claims. (Cl. 117—100)

This invention relates to a free flowing and hydrophobic starch and methods of manufacturing the same.

By "free flowing" is meant unusual mobility to an extent not possessed by ordinary finely ground starch, having the characteristics of an impalpable powder or dust.

The new product of this invention has a number of important industrial uses. For example, it constitutes an excellent dusting powder for use in off-set printing, to be blown on a freshly printed sheet to prevent the ink from transferring to the back of the following printed sheet which will come to rest thereupon.

Another important use is for dusting surgical gloves which must be autoclaved for sterilization. Other rubber goods and other articles and materials may advantageously be dusted with this new hydrophobic product, especially if they are subsequently to be subjected to heat and moisture.

The invention involves treating starch in a water slurry with a water-soluble silicone and subsequently filtering, drying, and pulverizing the treated starch.

The resultant product has dry flow characteristics not found in any raw starch or other starch product, no matter how finely ground such other products may be. In fact, the flow characteristics of this new product resemble those of a fluid rather than a solid. Additionally, this hydrophobic product will not slurry in water in a manner normal to ordinary starches, nor will the starch granules swell and paste when heated in a water medium.

The general object of the invention is to produce a free flowing and hydrophobic starch having the above described characteristics.

Another object of the invention is to provide a method of producing this new product, which is practical, convenient, and economical to operate.

The invention may be practiced as follows: A slurry of ungelatinized starch having a density in the range of 5 to 24° Baumé is prepared, preferably, if desired, with a density of 18° Baumé. The slurry is then heated to a temperature within a range between room temperature and 140° F. and below the gelatinization temperature of the starch. A preferred temperature is 120° F. During the heating and while the slurry is subject to agitation, the water soluble silicone solids are added to the slurry and thoroughly mixed therewith.

The heating and agitation are continued for from 0.5 hour to as much as 8 hours, if desired. Treatment for longer than 8 hours does not appear to improve the desired characteristics of the product.

At the end of the selected treatment period, the starch is filtered and the filter cake is dried in any appropriate manner, for example, by conventional starch plant methods. The dried filter cake should then be thoroughly pulverized, for example, in a hammer mill. It will then possess the free flowing characteristics above described.

The silicone employed in this process preferably is a salt of methyl siliconic acid such as mono-sodium methyl siliconate. The percentage of silicone used may be varied from 0.01% to 1.0% of the weight of the dry starch. More than 1.0% appears not to yield any better result. The preferred silicone solids concentration is 0.4%.

While the preferred method of practicing the invention has been described above in some detail, it should be understood that variations and modifications thereof may be employed and are intended to be embraced by the appended claims.

I claim:

1. A method of treating starch to render it hydrophobic and free flowing comprising forming a water slurry of starch, adding a water solution of mono-sodium methyl siliconate to said slurry, and mixing it thereinto with the siliconate present in the mixture in a proportion of between .01% and 1.0% based on the dry weight of the starch, heating the mixture to a temperature above 120° F. but below the gelatinization temperature of the starch for at least a half hour, filtering the treated slurry at the end of the heating period, and subsequently drying and pulverizing the dried filtered starch product.

2. A method of treating starch to render it hydrophobic and free flowing comprising forming a water slurry of starch, having a density between 5° and 24° Baumé, adding to said slurry a water solution of mono-sodium methyl siliconate, with the siliconate present in the mixture in a proportion of about 0.4% based on the dry weight of the starch, heating the slurry to a temperature between 120° F. and the gelatinization temperature of the starch for at least a half hour, filtering the treated slurry at the end of the heating period, and subsequently drying and pulverizing the dried filtered starch product.

References Cited in the file of this patent

UNITED STATES PATENTS

| | | |
|---|---|---|
| 2,140,375 | Allen et al. | Dec. 13, 1938 |
| 2,507,200 | Elliott et al. | May 9, 1950 |
| 2,614,945 | Krisan | Oct. 21, 1952 |
| 2,647,892 | La Brie et al. | Aug. 4, 1953 |